Dec. 26, 1967 J. L. KIMBALL ETAL 3,360,734
DC STABILIZED AMPLIFIER WITH EXTERNAL CONTROL
Filed May 4, 1965
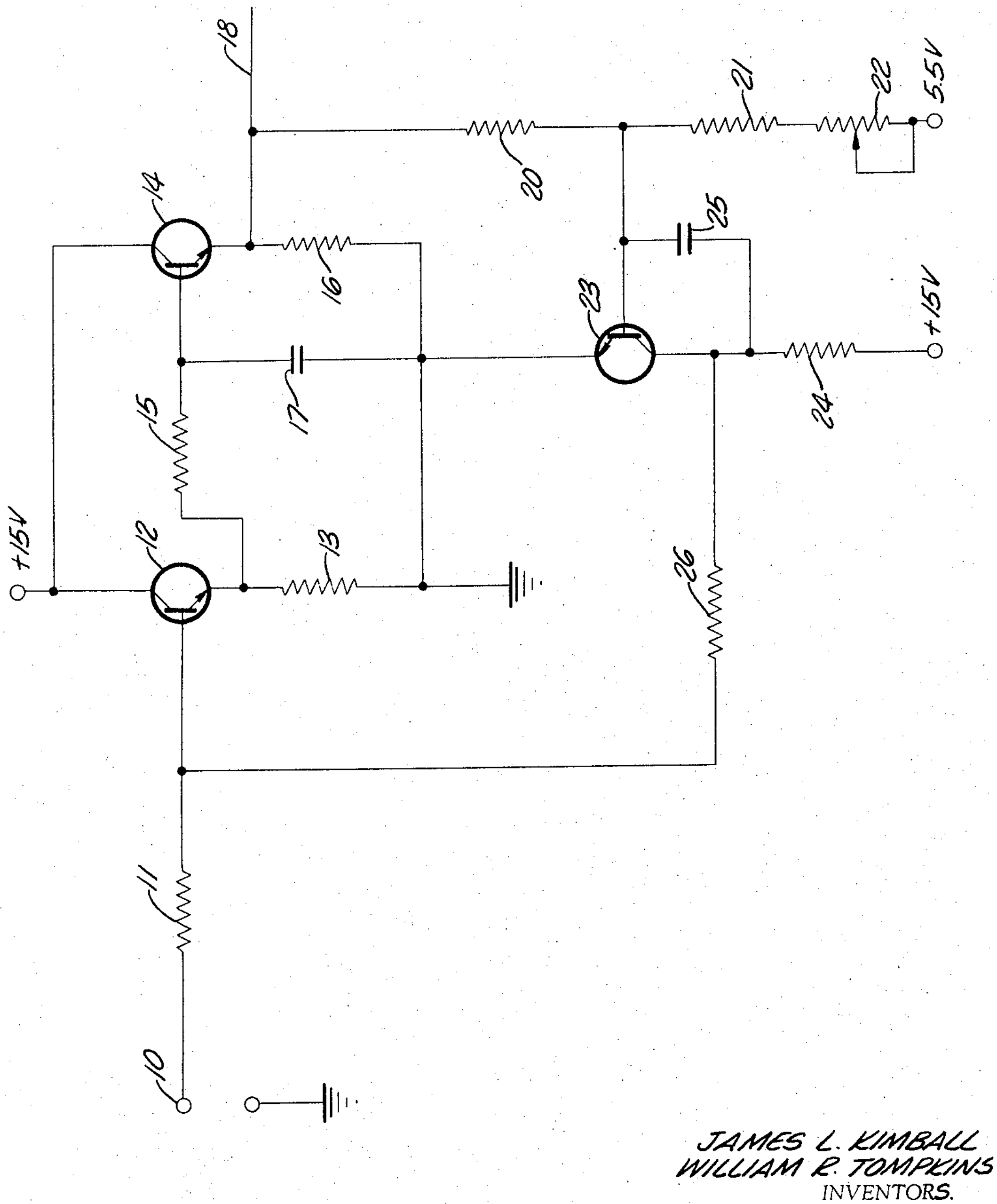
JAMES L. KIMBALL
WILLIAM R. TOMPKINS
INVENTORS.
BY Lyon & Lyon
ATTORNEYS

United States Patent Office 3,360,734

Patented Dec. 26, 1967

3,360,734

DC STABILIZED AMPLIFIER WITH EXTERNAL CONTROL

James L. Kimball, La Mesa, and William R. Tompkins, San Diego, Calif., assignor to Cohu Electronics, Inc., San Diego, Calif., a corporation of Delaware Filed May 4, 1965, Ser. No. 453,146
4 Claims. (Cl. 330—25)

ABSTRACT OF THE DISCLOSURE

An amplifier having a DC stabilization whose level is controlled by an external reference source and having a feedback circuit responsive to DC variations in the output but not to high frequency AC signals.

This invention relates to an amplifier and more particularly relates to a video amplifier whose DC output voltage level is maintained at a constant value.

It is an object of the present invention to provide an amplifier whose DC output voltage level can be maintained constant.

It is another object of the present invention to provide such an amplifier wherein the DC output voltage level can be externally adjusted.

It is also an object of the present invention to provide a video amplifier having a negative feedback path which has high voltage gain for DC but is essentially out of the circuit for AC.

Other objects and advantages of the present invention will become more apparent upon reference to the accompanying description and drawings in which the single figure is an electrical schematic diagram of the amplifier of the present invention.

In the drawing, the signals to be amplified appear at input terminal 10 and are passed through a resistor 11 to the base of an NPN transistor 12 which is connected as an emitter follower. The emitter of the transistor 12 is connected to ground by resistor 13 and to the base of a second NPN transistor 14 by a resistor 15. The transistor 14 is also connected as an emitter follower with its emitter connected to ground through a resistor 16. The base of transistor 14 is also coupled to ground through a capacitor 17. The collectors of both of the transistors 12 and 14 are connected to a source of positive potential, for example, +15 volts. The output of the transistor 14 appears on the line 18.

The output of the transistor 14 is also connected to a negative voltage reference source through resistors 20 and 21 and adjustable resistor 22. The junction of resistors 20 and 21 is connected to the base of an NPN transistor 23 whose emitter is grounded and whose collector is connected to the positive voltage source through a resistor 24. The collector of transistor 23 is also coupled to its base through a capacitor 25 and to the base of transistor 12 through a resistor 26.

By providing the feedback transistor 23 with a high voltage gain, the DC output voltage level of the amplifier can be made dependent only on the values of the resistors 20, 21, 22 and the negative reference voltage and thus independent of variations in the amplifier itself. Let it be assumed that the desired DC output level voltage on line 18 is +5.1 volts. The total drop across the resistors 20, 21 and 22 will thus be 10.6 volts, if the reference voltage source provides −5.5 volts. If the DC potential on the line 18 changes, this change will be reflected at the junction of the resistors 20 and 21. This change will be amplified by the transistor 23 and applied to the base of the transistor 12 causing its conductivity to change. This will in turn cause a change in the conductivity of the transistor 14 causing its DC output to return to the desired level. This level may be adjusted by means of the adjustable resistor 22.

The amplifier thus provided has a high gain negative feedback path for DC voltage variations. However, it is desirable that the feedback amplifier 23 have high gain only for DC variations and therefore the capacitor is provided to make the feedback circuit an integrator so that the voltage is inversely proportional to frequency. The feedback circuit is thus essentially out of the circuit for the video or other high frequency signals that may be applied to the input terminals 10.

From the foregoing description, it can be seen that an amplifier has been provided that offers a high input impedance for video signals and maintains a constant DC output voltage level. This DC level can be adjusted by an external control to any desired value. The amplifier is thus essentially one with two inputs. For DC it responds to the reference voltage while for video it responds to the input at terminal 10. The features of this amplifier are particularly useful in systems such as that disclosed in application Ser. No. 453,116 filed this May 4, 1965 by Harold R. Ahrens and the present inventors entitled "Video Switching System" and assigned to the assignee of the present application, and disclosure of which is incorporated by reference herein.

The invention may be embodied in other specific forms not departing from the spirit or central characteristics thereof. The present embodiment is therefore to be considered in all respects as illustrative and not restrictive, the scope of the invention being indicated by the appended claims rather than by the foregoing description, and all changes which come within the range and meaning of equivalency of the claims are therefore intended to be embraced therein.

We claim:

1. An AC amplifier having a constant DC output voltage level, comprising, a source of energizing potential, a first transistor having an emitter, a collector and a base, means for connecting said first transistor across said source of potential as an emitter follower, an external reference potential source independent of said source of energizing potential, means including resistive means for coupling the emitter of said first transistor to said external reference potential source, a second transistor having a base and an output electrode, means for connecting said second transistor across said source of potential, means for connecting the base of said second transistor to a point intermediate the ends of said resistive means, means coupling the output electrode of said second transistor with the base of said first transistor, capacitive means coupling the output electrode of said second transistor with the base thereof, and means for supplying AC signals to the base of said first transistor.

2. An AC amplifier having a constant DC output voltage level comprising: a source of energizing potential, first and second transistors each having a base and an output electrode, means for connecting said first and second transistors across said source of potential as cascaded emitter followers, an external reference potential source independent of said source of energizing potential and of opposite polarity thereto, resistive means connecting the output electrode of said second emitter follower ιo said reference potential source, a third transistor having a base and an output electrode, means for connecting the base of said third transistor to a point intermediate the ends of said resistive means, second resistive means connecting the output electrode of said third transistor to the base of said first transistor, capacitive means coupling said output electrode of said third transistor with the base thereof, and means for supplying AC signals to the base of said first transistor.

3. An AC amplifier having a constant DC output voltage level, comprising: a source of energizing potential, first and second transistors, means connecting the collectors of said transistors to one side of said source of potential, first and second resistive means connecting the emitters of said first and second transistors to the other side of said source, third resistive means connecting the emitter of said first transistor to the base of said second transistor, an external reference potential source indeptndent of said source of energizing potential, fourth and fifth resistive means connected in series and connecting the emitter of said second transistor to said reference potential source, a third transistor, means connecting the collector of said third transistor to said one side of said source and said emitter of said third transistor to said other side of said source, means connecting the base of said third transistor to the junction of said fourth and fifth resistive means, sixth resistive means connecting the collector of said third transistor to the base of said first transistor, capacitor means coupling the collector of said third transistor with the base thereof, and means for supplying AC signals to the base of said first transistor.

4. An AC amplifier having a constant DC output voltage level, comprising: a source of AC signals, a source of positive energizing potential, a first NPN transistor, means connecting the collector of said first transistor to said source of positive potential, a first resistor connecting the emitter of said first transistor to ground, a second resistor connecting the base of said first transistor to said signal source, a second NPN transistor, means connecting the collector of said second transistor to said source of positive potential, a third resistor connecting the emitter of said second transistor to ground, a fourth resistor connecting the emitter of said first transistor to the base of said second transistor, an external negative reference potential source, a first and second resistive means connecting the emitter of said second transistor to said negative reference potential source, said second resistive means having an adjustable resistance, a third NPN transistor, means connecting the emitter of said third transistor to ground, a fifth resistor connecting the collector of said third transistor to said source of positive potential, means connecting the base of said third transistor to the junction of said first and second resistive means, a sixth resistor connecting the collector of said third transistor to the base of said first transistor, and a capacitor coupling the collector and base of said third transistor.

References Cited

UNITED STATES PATENTS

| | | | |
|---|---|---|---|
| 2,979,666 | 4/1961 | Erath | 330—25 X |
| 3,196,362 | 7/1965 | Smith | 330—25 X |

FOREIGN PATENTS

| | | |
|---|---|---|
| 905,598 | 9/1962 | Great Britain. |

ROY LAKE, *Primary Examiner.*

J. B. MULLINS, *Assistant Examiner.*